United States Patent
Yoshii et al.

(10) Patent No.: US 10,678,434 B2
(45) Date of Patent: Jun. 9, 2020

(54) STORAGE SYSTEM AND STORAGE CONTROL METHOD FOR IMPROVING A DEDUPLICATION PROCESS

(71) Applicant: HITACHI, LTD., Tokyo (JP)

(72) Inventors: Yoshihiro Yoshii, Tokyo (JP); Yasuo Watanabe, Tokyo (JP); Yoshinori Ohira, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/552,988

(22) PCT Filed: May 12, 2015

(86) PCT No.: PCT/JP2015/063559
§ 371 (c)(1),
(2) Date: Aug. 23, 2017

(87) PCT Pub. No.: WO2016/181479
PCT Pub. Date: Nov. 17, 2016

(65) Prior Publication Data
US 2018/0039423 A1 Feb. 8, 2018

(51) Int. Cl.
*G06F 3/06* (2006.01)
*G06F 12/00* (2006.01)

(52) U.S. Cl.
CPC ............ *G06F 3/0608* (2013.01); *G06F 3/065* (2013.01); *G06F 3/068* (2013.01); *G06F 3/0641* (2013.01); *G06F 3/0689* (2013.01); *G06F 12/00* (2013.01)

(58) Field of Classification Search
None
See application file for complete search history.

(56) References Cited

U.S. PATENT DOCUMENTS 8,165,221 B2    4/2012  Zheng et al.
9,235,475 B1 *  1/2016  Shilane ............... G06F 11/1453
(Continued)

FOREIGN PATENT DOCUMENTS

JP   2011-175421 A   9/2011
WO   2014/087508 A1  6/2014

OTHER PUBLICATIONS

Srinivasan, K., Bisson, T., Goodson, G. R., & Voruganti, K. (Feb. 2012). iDedup: latency-aware, inline data deduplication for primary storage. In Proceedings of the 10th USENIX conference on File and Storage Technologies (FAST'12). USENIX Association, USA, 24. (Year: 2012).*

(Continued)

*Primary Examiner* — Edward J Dudek, Jr.
*Assistant Examiner* — Ralph A Verderamo, III
(74) *Attorney, Agent, or Firm* — Volpe and Koenig, P.C.

(57) ABSTRACT

This storage system is designed to: divide data into a plurality of chunk data (pieces of data) in a deduplication process; select one or more chunk data from among the plurality of chunk data in accordance with a sampling period which indicates that, on average, one chunk data be selected from among each N chunk data; and calculate a fingerprint, such as a hash value, for each of one or more characteristic chunk data, which are the selected one or more chunk data, and determine whether data including the one or more characteristic chunk data is a duplication. The storage system changes the sampling period on the basis of the results of past deduplication processes.

13 Claims, 11 Drawing Sheets

(56) References Cited

U.S. PATENT DOCUMENTS

| | | | |
|---|---|---|---|
| 10,135,462 B1 * | 11/2018 | Wallace | H03M 7/3091 |
| 2014/0365449 A1 * | 12/2014 | Chambliss | G06F 3/0641 |
| | | | 707/692 |
| 2015/0010143 A1 * | 1/2015 | Yang | G09C 1/00 |
| | | | 380/28 |

OTHER PUBLICATIONS

Lillibridge, M., Eshghi, K., Bhagwat, D., Deolalikar, V., Trezis, G., & Camble, P. (Feb. 2009). Sparse Indexing: Large Scale, Inline Deduplication Using Sampling and Locality. In Proceedings of the 7th conference on File and storage technologies (FAST '09). USENIX Association, USA. 111-123. (Year: 2009).*

Xia, W., Jiang, H., Feng, D., & Hua, Y. (Jun. 2011). SiLo: A Similarity-Locality based Near-Exact Deduplication Scheme with Low RAM Overhead and High Throughput. In Proceedings of the 2011 USENIX conference on USENIX annual technical conference (USENIXATC'11). USENIX Association, USA, 26-28. (Year: 2011)*

Bhagwat, D., Eshghi, K., Long, D. D., & Lillibridge, M. (Sep. 2009). Extreme binning: Scalable, parallel deduplication for chunk-based file backup. 2009 IEEE International Symposium on Modeling, Analysis & Simulation of Computer and Telecommunication Systems, London, 2009, pp. 1-9. IEEE. (Year: 2009).*

International Search Report for WO 2016/181479 A1, dated Jul. 7, 2015.

* cited by examiner

FIG. 4

Address management table — 24

| Logical address (241) | Physical address (242) |
|---|---|
| 0x010 | 0x100 |
| 0x020 | 0x110 |
| 0x030 | 0x100 |
| 0x040 | 0x110 |
| 0x050 | 0x120 |

FIG. 5

Fingerprint management table — 25

| Characteristic fingerprint (251) | Logical address (241) |
|---|---|
| A | 0x10 |
|  |  |
|  |  |

FIG. 6

Sampling period management table 26

| LUN # 261 | Zone # 262 | Aggregate count 263 | Total duplicated length 264 | Average duplicated length 265 | Sampling period 266 |
|---|---|---|---|---|---|
| 0 | 0 | 100 | 3200 | 32 | 4 |
| 0 | 1 | 100 | 400 | 4 | 4 |
| 0 | 2 | 50 | 400 | 8 | 4 |
| 1 | 0 | 50 | 6400 | 128 | 4 |
| 1 | 1 | 50 | 3200 | 64 | 16 |
| 1 | 2 | 50 | 3200 | 64 | 16 |

FIG. 9

Statistics management table 27

| LUN0/Zone #0 | Duplicated length range (271) | Reduction amount (sampling period = 4) (272) | Predicted reduction amount (sampling period = 8) (273) | Predicted reduction amount (sampling period = 1) (274) |
|---|---|---|---|---|
| | [0 KB, 4 KB) | 40,000 KB | 19,283 KB | 298,564 KB |
| | [4 KB, 8 KB) | 80,000 KB | 41,432 KB | 228,258 KB |
| | [8 KB, 16 KB) | 160,000 KB | 91,351 KB | 276,757 KB |
| | [16 KB, 32 KB) | 1,600,000 KB | 1,072,876 KB | 1,946,421 KB |
| | [32 KB, 64 KB) | 800,000 KB | 659,765 KB | 826,170 KB |
| | ≥ 64 KB | 1,000,000 KB | 1,000,000 KB | 1,000,000 KB |
| | Total value | 3,680,000 KB | 2,884,798 KB | 4,576,179 KB |

FIG. 10

Sampling period management table 26

| LUN | Zone # 262 | Aggregate count 263 | Total duplicated length 264 | Average duplicated length 265 | Sampling period 266 | Reduction amount [MB] 267 | Reduction rate 268 | Target reduction rate 269 |
|---|---|---|---|---|---|---|---|---|
| 0 | 0 | 100 | 3200 | 32 | 4 | 3,680 MB | 95% | 90% |
| 0 | 1 | 100 | 400 | 4 | 4 | 2,000 MB | 70% | 90% |
| 0 | 2 | 50 | 400 | 8 | 4 | 2,500 MB | 95% | 90% |
| 1 | 0 | 50 | 6400 | 128 | 4 | 5,600 MB | 98% | 90% |
| 1 | 1 | 50 | 3200 | 64 | 16 | 2,000 MB | 90% | 90% |
| 1 | 2 | 50 | 3200 | 64 | 16 | 2,000 MB | 90% | 90% |

STORAGE SYSTEM AND STORAGE CONTROL METHOD FOR IMPROVING A DEDUPLICATION PROCESS

TECHNICAL FIELD

This invention generally relates to deduplication of data.

BACKGROUND ART

In recent years, deduplication technology has been widely used. In general, the deduplication technology is technology of reducing capacity consumption by deleting data other than one data among a plurality of duplicated data. Checking whether duplicated data are present for every data requires a large amount of calculation. Thus, it is a common practice to perform calculation for each data by using a hash function to calculate a representative value of data such as a hash value, and perform a comparison process only between data items in which the representative values match with each other. The method of calculating the representative value is not limited to the method using the hash function, and any calculation method can be employed as long as the values calculated from duplicated data are always identical. The representative value such as a hash value used for the deduplication technology is hereinafter referred to as "fingerprint". The fingerprint is registered in management information such as a table.

In general, the number of fingerprints held by a storage system increases along with an increase in storage capacity. When the storage system has many fingerprints, the performance of the storage system decreases. This is because the size of fingerprint management information in which fingerprints are registered is large and the search range of fingerprints is large and because the number of updates of the fingerprint management information is large. For example, when the fingerprint is 128 bits for data of 4 KB, fingerprints of 4 TB need to be registered in the fingerprint management information for data of 1 PB. Offloading the calculation of fingerprints and the update of the fingerprint management information to hardware can require expensive hardware capable of high-speed processing, with the result that the cost of the storage system can increase.

In PTL 1, an anchor exists for a part of a data set, and the anchor is specified from the data set. When the specified anchor does not exist in an anchor database, the specified anchor is stored in the anchor database.

CITATION LIST

Patent Literature

[PTL 1]
U.S. Pat. No. 8,165,221

SUMMARY OF INVENTION

Technical Problem

Reducing the number of fingerprints registered in the fingerprint management information (hereinafter, registered FP count) can reduce the size of the fingerprint management information, in other words, reduce the search range of fingerprints. Thus, the overhead of search is expected to be reduced, and the number of times by which fingerprints are registered in the fingerprint management information is reduced and hence the overhead of update of the fingerprint management information is also expected to be reduced. A conceivable method for reducing the registered FP count is to calculate each fingerprint only for partial data among all data items. This method, however, can reduce reduction effect (for example, data reduction amount or reduction rate).

Solution to Problem

A storage system is configured to, in a deduplication process: divide data into a plurality of chunk data (pieces of data); select one or more chunk data from among a plurality of chunk data in accordance with a sampling period that indicates selection of one chunk data from N chunk data on average; calculate, for each of one or more characteristic chunk data, which are the selected one or more chunk data, a fingerprint such as a hash value; and determine whether data including the characteristic chunk data is duplicated. The storage system is configured to change the sampling period on the basis of results of past deduplication processes.

Advantageous Effects of Invention

Both the suppression of reduction in data reduction effect and the improvement in performance of deduplication can be expected to be achieved.

BRIEF DESCRIPTION OF DRAWINGS

FIG. 4 illustrates a configuration example of an address management table according to Embodiment 1.

FIG. 5 illustrates a configuration example of a fingerprint management table according to Embodiment 1.

FIG. 6 illustrates a configuration example of a sampling period management table according to Embodiment 1.

FIG. 9 illustrates a configuration example of a statistics management table according to Embodiment 2.

FIG. 10 illustrates a configuration example of a sampling period management table according to Embodiment 2.

DESCRIPTION OF EMBODIMENTS

Figure 1:
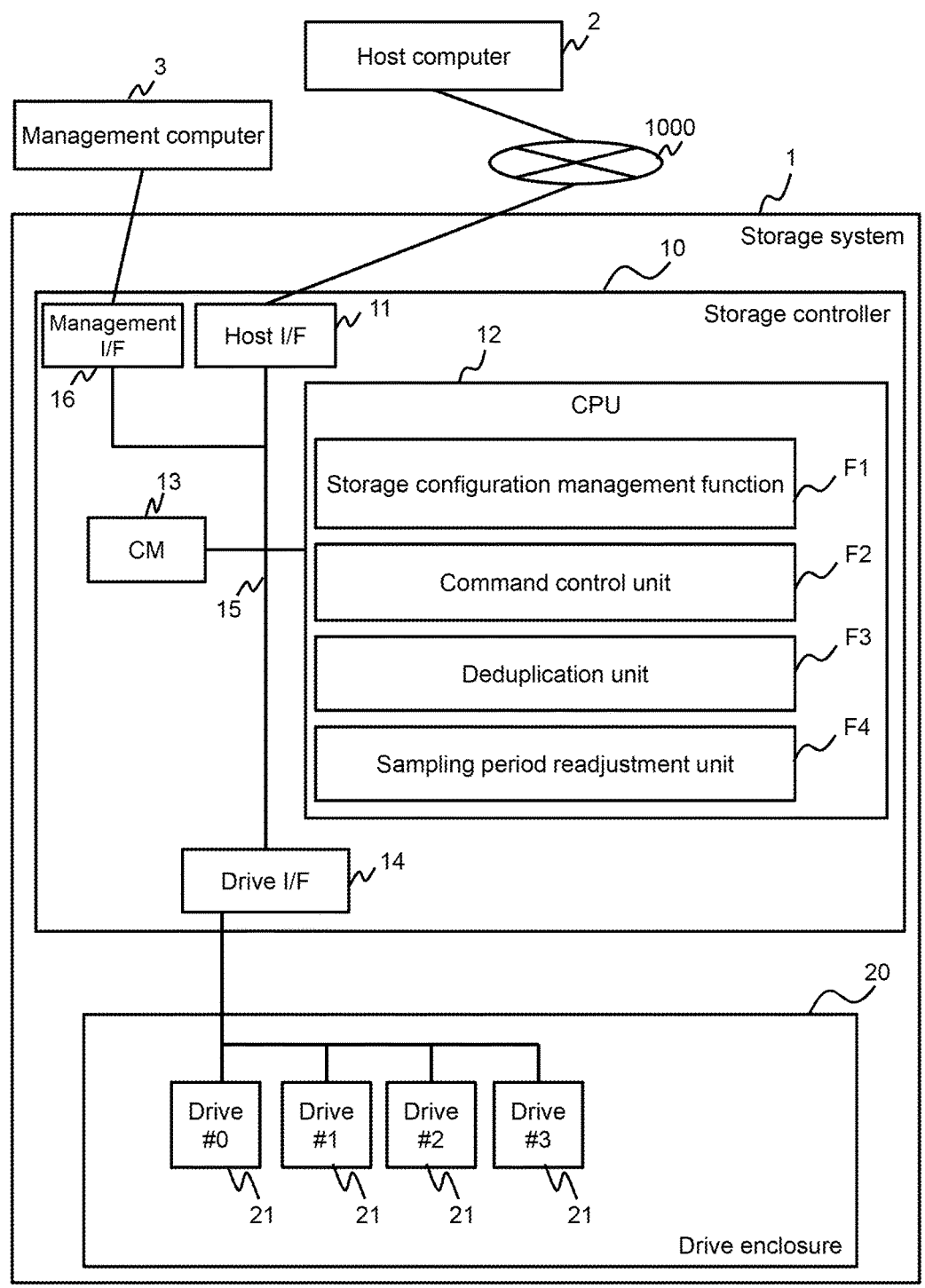
FIG. 1 is a block diagram illustrating an overall configuration of a computer system according to Embodiment 1.

Some embodiments are described below.

In the following description, information is sometimes described with the expression "xxx table", but the information may be expressed by any kind of data structure. In other words, the "xxx table" can be referred to as "xxx information" in order to indicate that the information is independent of the data structure. In the following description, the configuration of each table is an example. One table may be divided into two or more tables, and all or a part of two or more tables may form one table.

In the following description, IDs or names are used as identification information of elements, but other kinds of identification information may be used instead of or in addition to IDs and names.

In the following description, reference symbols or common numbers in reference symbols are sometimes used when describing the same kind of elements without distinguishing from each other, and reference symbols or IDs allocated instead of reference symbols are sometimes used when distinctively describing the same kind of elements.

In the following description, an I/O (Input/Output) request is a write request or a read request, and may be called access request. In the following description, a "storage unit" may be one or more storage devices including a memory. Of a main storage device (typically, volatile memory) and an auxiliary storage device (typically, non-volatile storage device), for example, the storage unit may be at least a main storage device.

In the following description, a "PDEV" represents a physical storage device, and typically, may be a non-volatile storage device (for example, auxiliary storage device). The PDEV may be, for example, an HDD (Hard Disk Drive) or an SSD (Solid State Drive).

In the following description, a "RAID" is an abbreviation of Redundant Array of Independent (or Inexpensive) Disks. A RAID group is formed of a plurality of PDEVs, and is configured to store data in accordance with a RAID level associated to the RAID group. The RAID group may be referred to as a parity group. The parity group may be, for example, a RAID group configured to store a parity.

In the following description, processes are sometimes described with a function unit (for example, storage configuration management unit, command control unit, deduplication unit, and sampling period readjustment unit) as the subject. The subject of the process may be a processor because the function unit implements a predetermined process by a processor (for example, CPU (Central Processing Unit)) executing a program with appropriate use of a storage unit (for example, memory) and/or an interface device (for example, communication port). Processes described with a function unit as the subject may be processes implemented by a processor, or an apparatus or a system including a processor. A processor may include a hardware circuit configured to implement a part or all of a process. At least a part of a plurality of function units may be implemented by a hardware circuit. A program may be installed to an apparatus such as a computer from a program source. Examples of the program source include a program distribution server and a computer readable storage medium. When the program source is a program distribution server, the program distribution server may include a processor (for example, CPU) and a storage unit, and the storage unit may store a distribution program and a program to be distributed. By executing the distribution program by the processor on the program distribution server, the processor on the program distribution server may distribute the program to be distributed to another computer. In the following description, two or more function units may be implemented as a single function unit, and a single function unit may be implemented as two or more function units.

In the following description, a management system may be configured by one or more computers. Specifically, for example, when a management computer displays information (specifically, for example, when a management computer displays information on its own display device or a management computer (for example, management server) transmits display information to a remote display computer (for example, management client)), the management computer is a management system. For example, when similar functions to the management computer are implemented by a plurality of computers, the plurality of computers (may include a display computer when information is displayed on the display computer) are the management system. The management computer (for example, management system) may include an interface device coupled to an I/O system including a display system, a storage unit (for example, memory), and a processor coupled to the interface device and the storage unit. The display system may be a display device included in the management computer or may be a display computer coupled to the management computer. The I/O system may be an I/O device (for example, a keyboard and a pointing device, or a touch panel) included in the management computer or may be a display computer or another computer coupled to the management computer. "Displaying display information" by the management computer refers to displaying display information on the display system, and this operation may be displaying display information on the display device included in the management computer or may be transmitting display information to the display computer from the management computer (in the latter case, display information is displayed by the display computer). Inputting and outputting information by the management computer may be inputting and outputting information via the I/O device included in the management computer or may be inputting and outputting information via a remote computer (for example, a display computer) coupled to the management computer. Outputting information may be displaying information.

In the following description, a "host system" is a system configured to transmit an I/O request to a storage system, and may include an interface device, a storage unit (for example, a memory), and a processor coupled thereto. The host system may be formed of one or more host computers. At least one host computer may be a physical computer, and the host system may include a virtual host computer in addition to the physical host computer.

In the following description, the "storage system" may be one or more storage apparatuses, and may include a plurality of PDEVs (for example, one or more RAID groups) and a storage controller configured to control I/O to and from the plurality of PDEVs. The storage controller may include a back-end interface device coupled to the plurality of PDEVs, a front-end interface device coupled to at least one of the host system or the management system, a storage unit, and a processor coupled thereto. The storage controller may be redundant.

In the following description, a "VOL" is an abbreviation of a logical volume and may be a logical storage device. The VOL may be a real VOL (RVOL) or may be a virtual VOL (VVOL). The VOL may include an online VOL provided to the host system coupled to the storage system providing the VOL, and an offline VOL that is not provided to the host system (not recognized by the host system). The "RVOL" may be a VOL based on a physical storage unit (for example, one or more RAID groups) of the storage system that includes that RVOL. The "VVOL" may be at least one of an externally-coupled VOL (EVOL), a capacity expansion VOL (TPVOL), and a snapshot VOL. The EVOL may be a VOL based on a storage space (for example, VOL) in an external storage system and according to storage virtualization technology. The TPVOL may be a VOL formed of a plurality of virtual areas (virtual storage areas) and according to capacity virtualization technology (typically, Thin Provisioning). The snapshot VOL may include a snapshot VOL provided as a snapshot of an original VOL. The TPVOL may typically be an online VOL. The snapshot VOL may be an RVOL. A "pool" is a logical storage area (or example, a set of a plurality of pool VOLs) and may be prepared for each application. For example, at least one of a TP pool or a snapshot pool may serve as the pool. The TP pool may be a storage area formed of a plurality of real areas (real storage areas). A real area may be allocated from the TP pool to the virtual area of the TPVOL. The snapshot pool may be a storage area to which data that is backed up from the original VOL is stored. One pool may be used as the TP pool or as the snapshot pool. The "pool VOL" may be a VOL forming the pool. The pool VOL may be an RVOL or may be an EVOL. The pool VOL may typically be an offline VOL. The VOL may be referred to as an LU (Logical Unit).

In the following description, "duplicated data" (and "duplicated chunk data") is duplicated successive data (chunk data). When data has W duplicated successive ranges, W duplicated data are present in the data. In other words, "duplicated data" (and "duplicated chunk data") is data in which the entire areas are duplicated.

Embodiment 1

FIG. 1 is a block diagram illustrating an overall configuration of a computer system according to Embodiment 1.

The computer system includes a host computer 2 configured to issue an I/O request, a storage system 1 configured to receive the I/O request, and a management computer 3 configured to manage the storage system 1. The host computer 2 is an example of a host system, and the management computer 3 is an example of a management system.

The storage system 1 includes, for example, a controller 10 and a drive enclosure 20. The storage system 1 transmits and receives a data block (data block input/output in response to I/O request) to and from the host computer 2 via a communication network 1000. The number of the controllers 10 may be one or two or more. The number of the drive enclosures 20 may be one or two or more. The host computer 2 is hereinafter sometimes abbreviated as "host 2".

The controller 10 includes, for example, a host I/F (Interface) 11, a CPU (Central Processing Unit) 12, a cache memory (hereinafter sometimes abbreviated as "CM") 13, a drive I/F 14, and a management I/F 16. The numbers of these elements 11 to 14 and 16 may each be two or more. These elements 11 to 14 and 16 are coupled to each other by an internal bus 15 capable of bidirectional data transmission.

The communication network 1000 can be configured by, for example, a SAN (Storage Area Network). The SAN can be constructed by, for example, a Fibre Channel, Ethernet (registered trademark), and/or an Infiniband. The communication network 1000 may be a LAN, an Internet network, a dedicated line network, or a combination thereof.

The host I/F 11 is an I/F for coupling the communication network 1000 and the controller 10 to each other. The host I/F 11 can be referred to also as, for example, "upper-level communication unit", "first communication unit", and "upper-level apparatus interface unit". The host I/F 11 is interposed between the communication network 1000 and the internal bus 15, and controls transmission/reception of data blocks.

The host I/F 11 receives an I/O (Input/Output) request from the host 2. The I/O request is associated with information indicating an I/O destination (access destination information) and an I/O command. The I/O destination information includes information identifying an I/O destination VOL and address information specifying an I/O destination region in the VOL. Examples of identification information on the I/O destination VOL includes an LUN (Logical Unit Number). Examples of the address information specifying the I/O destination region in the VOL include an LBA (Logical Block Address). The I/O command is a write command or a read command.

The CPU 12 implements various functions F1 to F4 by executing one or more computer programs (hereinafter referred to as "programs"). The programs may be stored in a non-volatile memory region (not shown) in the controller 10, or may be stored in a drive 21 outside the controller. A storage configuration management unit F1 is a function of managing various configurations of storage, such as a RAID group configuration, a pool configuration, and a virtual volume configuration. The command control unit F2 is the function of processing a read command and a write command received from the host 2, and returning the processing results to the host 2. A deduplication unit F3 is the function of performing a deduplication process of data. A sampling period readjustment unit F4 is a function of implementing a sampling period readjustment process.

When receiving an I/O command from the host 2, the CPU 12 extracts I/O destination information associated to the I/O command, and specifies an I/O destination region from the I/O destination information. The CPU 12 specifies one or more drives 21 for respectively providing one or more logical pages corresponding to the specified I/O destination region. Then, the CPU 12 transmits an I/O command associated with the address of the logical page to each of the specified drives 21. The I/O command transmitted to each drive 21 may be associated with, in addition to the address of the logical page, identification information (for example, drive number) for specifying a transmission destination drive 21 of the I/O command. In this embodiment, the CPU 12 executes the deduplication unit F3. However, the deduplication unit F3 may be dedicated hardware (for example, ASIC (Application Specific Integrated Circuit) or FPGA (Field-Programmable Gate Array)).

The CM 13 temporarily holds a data block. The data block is hereinafter sometimes abbreviated as "data". The CM 13 may be configured by a non-volatile memory. The non-volatile memory may be a flash memory or a magnetic disk memory. Alternatively, the CM 13 may be configured such that a backup power supply is provided to a volatile memory. The volatile memory may be a DRAM (Dynamic Random Access Memory). The backup power supply may be a battery such as a lithium ion secondary battery. The host I/F 11, the CPU 12, and/or the drive I/F 14 may input and output a data block to and from the CM 13 via an internal bus 15.

The drive I/F 14 is an I/F for coupling the controller 10 and the drive enclosure 20 to each other. The drive I/F 14 can be referred to also as, for example, "lower-level communication unit", "second communication unit", and "storage apparatus interface unit".

The drive I/F 14 is interposed between the internal bus 15 and the drive 21, and controls transmission/reception of data blocks. The drive I/F 14 may be an I/F compatible with SAS or Fibre Channel. The drive I/F 14 may transmit a data block received from the drive 21 to the CM 13.

The drive enclosure 20 includes a plurality of drives 21 (for example, drives #0, #1, #2, and #3). The drives 21 are an example of PDEVs. The number of the drives 21 is not limited. The drive 21 may be an HDD (Hard Disk Drive) or another non-volatile memory such as an SSD (Solid State Drive). The drives 21 coupled to the drive enclosure 20 may have a plurality of kinds of HDDs and SSDs in a mixed manner. The drive I/F 14 and the drive 21 may be coupled to each other by a SAS (Serial Attached SCSI), an FC (Fibre Channel), or an SATA (Serial AT Attachment).

When the drive 21 in the drive enclosure 20 receives an I/O command (write command or read command) that designates an address of a logical page provided by the drive 21 from the controller 10, the drive 21 executes a process based on the I/O command.

The storage system 1 may include two or more drive enclosures 20. In this case, the drive I/F 14 may have a plurality of ports, and one drive enclosure 20 may be coupled to one port of the drive I/F 14. Two or more drive enclosures 20 and one drive I/F 14 may be coupled to each other via a predetermined switch apparatus (not shown). Two or more drive enclosures 20 may be cascade-coupled.

The management I/F 16 is an I/F for coupling a communication network (not shown) (or communication network 1000) to which the management computer 3 is coupled and the controller 10 to each other. The management I/F 16 is interposed between the communication network (not shown) (or communication network 1000) and the internal bus 15, and controls communication with the management computer 3.

Figure 2:
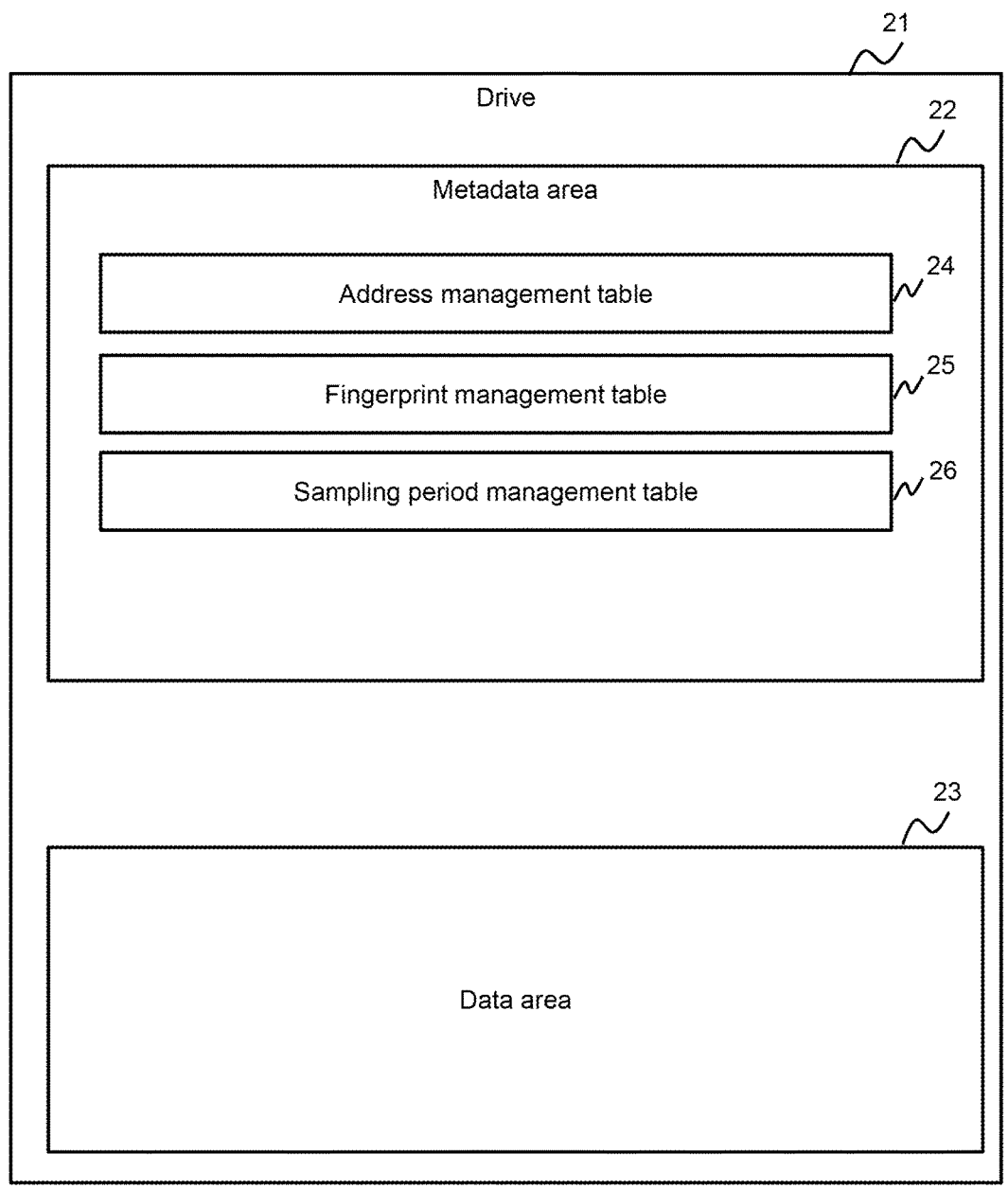
FIG. 2 is a block diagram illustrating a logical configuration of a storage region of a drive according to Embodiment 1.

FIG. 2 is a block diagram illustrating a logical configuration of a storage region of the drive 21.

The drive 21 includes, for example, a metadata region (control information region) 22 and a data region 23 as a logical configuration of storage regions of the drive 21.

In the data region 23, a data block accompanying a write command from the controller 10 is stored.

In the metadata region 22, management information for controlling or managing the data region 23 is stored. For example, the management information includes an address management table 24, a fingerprint management table 25, and a sampling period management table 26. Details of each table are described later with reference to the drawings. All or necessary part of these tables 24 to 27 may be cached in the CM 13 such that the controller 10 can access information in the tables at high speed. The tables 24 to 27 may be stored in a memory (for example, CM 13) in the controller 10 instead of the drive 21.

Figure 3:
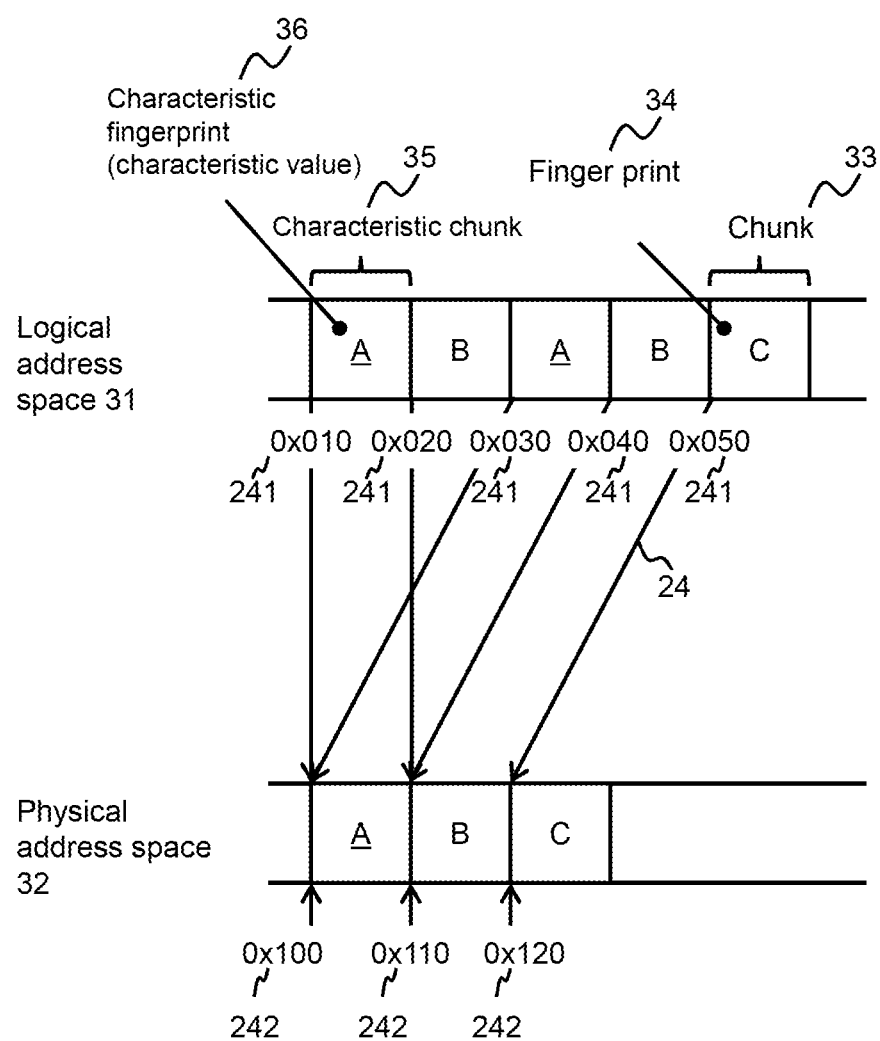
FIG. 3 is an operation schematic diagram of deduplication according to Embodiment 1.

FIG. 3 is an operation schematic diagram of deduplication.

A logical address space 31 is a space accessed by the host 2. A physical address space 32 is an address space in a final storage medium (drive 21 in this embodiment). Areas between the logical address space 31 and the physical address space 32 are mapped by the address management table 24.

The deduplication process is performed between the logical address space 31 and the physical address space 32. The logical address space 31 is managed by being divided in units of regions called "chunks". The size of chunks 33 may be a fixed length or a variable length. Data having a chunk size is sometimes referred to as "chunk data". Data to be divided into a plurality of chunk data (in other words, a set of a plurality of chunk data) is sometimes referred to as "data set". The data set may be one or more data blocks or a part thereof. The "data block" is data accompanying an I/O command.

For example, the deduplication process may be performed in units of chunks 33. In order to detect duplicated chunk data, calculation using a hash function is performed for each chunk data to calculate a representative value such as a hash value, and each of chunk data other than one chunk data among a plurality of chunk data having the same representative value is specified as "duplicated chunk data". Thus, the duplicated chunk data can be deleted. The representative value of chunk data is referred to as "fingerprint" in Embodiment 1. In the drawing, an alphabet illustrated in a chunk 33 represents a fingerprint 34 of the chunk 33. In this case, among the chunks 33, a chunk satisfying particular conditions is referred to as "characteristic chunk", and chunk data corresponding to the characteristic chunk is referred to as "characteristic chunk data". A fingerprint of the characteristic chunk data is referred to as "characteristic fingerprint" in order to distinguish from normal fingerprints 34. In the drawing, fingerprints of characteristic chunk data are underlined in order to distinguish between the characteristic chunks 35 and the other chunks 33.

The characteristic chunk data conditions (chunk data managed as characteristic chunk data) may be, for example, such that chunk data is the first chunk data in a file or such that chunk data has a remainder of 0 obtained by dividing its fingerprint by a given integer. In Embodiment 1, the characteristic chunk data conditions are not fixed but are variable. Specifically, in Embodiment 1, the characteristic chunk data is chunk data sampled in accordance with a sampling period, and the sampling period is variable ("sampling period" is described later).

In general, in order to search whether duplicated chunk data was stored in the past, all fingerprints 34 corresponding to all chunk data need to be registered in fingerprint management information. In Embodiment 1, an example of the fingerprint management information is a fingerprint management table 25. Details of the table structure are described later with reference to the drawings. For storing new chunk data (for storing non-duplicated chunk data), in order to specify chunk data as duplicated chunk data when the same chunk data is stored next and exclude the specified chunk data, a fingerprint 34 of the new chunk data and a logical address of a storage destination chunk of the new chunk data are registered in the fingerprint management table. In general, the number of fingerprints 34 registered in the fingerprint management table 25 increases along with an increase in storage capacity (for example, VOL capacity). Thus, when the storage system 1 has many fingerprints, the performance of the storage system 1 decreases if a complicated table structure is employed. Offloading the calculation of fingerprints and the update of the fingerprint management table 25 to hardware can require expensive hardware capable of high-speed processing, with the result that the cost of the storage system 1 can increase. To suppress the decrease in performance, it is preferred that the number of fingerprints 34 registered in the fingerprint management table 25 be reduced as much as possible. However, in the case where a given fingerprint 34 is not registered in the table, even if chunk data items from which the same fingerprint 34 is obtained are written in the storage system 1, duplicated chunk data cannot be detected because the fingerprint 34 has not been registered in the fingerprint management table 25, with the result that the reduction effect (deduplication rate) reduces.

In view of the above, Embodiment 1 focuses on the fact the range of duplicated data is larger than a chunk 33 in actual environments. The fingerprint 34 registered in the fingerprint management table 25 is limited only to a characteristic fingerprint 36. When chunk data having the characteristic fingerprint 36 is written next, data of logical addresses of data before and after the chunk data (only data before or after the chunk data is sufficient) are read (for example, read in units of chunks), and it is confirmed whether the data match with each other by Bit-by-Bit (or Byte-by-Byte). In actual environments, the range of duplicated data is larger than a chunk 33, and hence it is highly probable that the peripheries of data including a given characteristic fingerprint 36 match with the data. Thus, in the case where the range of duplicated data is large, even if fingerprints 34 registered in the fingerprint management table 25 are thinned out, the reduction effect comparable with that when the fingerprints 34 are not thinned out can be expected to be obtained by confirming whether peripheries of characteristic chunk data match with each other. Further, the overhead of registering fingerprints in the fingerprint management table 25 can be reduced to improve throughput performance of deduplication. In other words, in Embodiment 1, both the suppression of the reduction in reduction effect and the improvement in performance can be expected to be achieved.

In this drawing, a characteristic fingerprint "A" is registered in the fingerprint management table 25, but a fingerprint "B", which is not the characteristic fingerprint 36, is not registered in the fingerprint management table 25. For chunk data after characteristic chunk data, from which the fingerprint "B" is obtained, however, when peripheries of the characteristic chunk data are compared, it can be detected that the chunk data from which the fingerprint "B" are obtained as "duplicated chunk data".

The frequency of thinning out (sampling) the fingerprints to be registered in the fingerprint management table 25 is referred to as "sampling period" in Embodiment 1. The sampling period is specifically the ratio of the number of all chunks 33 to the number of characteristic chunks 35. The expression "the sampling period is "N" when one characteristic chunk 35 is selected from N chunks 33 on average" can be employed.

In the case of employing a method of selecting chunk data that has a remainder of 0 obtained by dividing a fingerprint by a given integer as a method of selecting characteristic chunk data, the sampling period and the number by which the fingerprint is divided only need to be the same. Specifically, when the sampling period is "4", chunk data that has a remainder of "0" obtained by dividing the calculated fingerprint by "4" is selected as characteristic chunk data. The reason is that when a cryptographic hash function such as SHA-1 is used as a method of calculating fingerprint, the calculated fingerprints have almost random values and hence the probability with which the remainder obtained by dividing a fingerprint by "4" as the sampling period is "0" is substantially equal to ¼.

In order to sample chunk data (select chunk data subjected to fingerprint calculation) without reducing the reduction effect, at least one characteristic chunk data needs to be included in a duplicated range (duplicated data) of a date set. For example, it is assumed that a data set is divided into chunk data having a fixed length of a unit of 4 KB, and data of 32 KB in the data set are duplicated data. In this case, 32 KB/4 KB=8 chunk data are included in the duplicated data of 32 KB. As long as at least one characteristic chunk data exists in the eight chunk data items, duplicated data of 32 KB can be deduplicated by the search for the characteristic fingerprint and the comparison of peripheral data of the characteristic chunk data. On the other hand, if no characteristic chunk data exists in the duplicated data of 32 KB, the duplicated data of 32 KB is not subjected to deduplication, and the reduction effect reduces. Thus, the sampling period needs to be selected in consideration of the relation between the sampling period, the average duplicated length (average size (data length) of duplicated data), and the reduction effect (deduplication rate). If the sampling period is set to "4", the probability P with which at least one characteristic chunk data is included in the duplicated data of 32 KB can be calculated by, for example, the following calculation expression.

$$P=1-(1-1/4)^{\wedge}(32\ KB/4\ KB)$$

When generalized, the probability $P(N, L_A, L_C)$ with which duplicated data is subjected to deduplication for the sampling period N, the average duplicated length $L_A$, and the chunk size $L_C$ can be calculated by the following calculation expression.

$$P(N,L_A,L_C)=1-(1-1/N)^{\wedge}(L_A/L_C) \qquad \text{Expression (1)}$$

$P(N, L_A, L_C)$ decreases monotonously with respect to an increase of N, and converges to $1-e^{\wedge}(-L_A/(L_C*N))$ when N is sufficiently large. Thus, the following inequality is established. In the inequality, e represents the Napier's constant.

$$P(N,L_A,L_C)>1-e^{\wedge}(-L_A/(L_C*N)$$

Therefore, the sampling period N only needs to be selected such that the probability $P(N, L_A, L_C)$ approaches "1". For example, when the sampling period N is selected to satisfy $N=L_A/(2*L_C)$, the following inequality is established, thus enabling data having the average duplicated length $L_A$ to be set as a deduplication target with a probability of at least 80% or more.

$$P(N,L_A,L_C)>1-e^{\wedge}(-2)\approx0.864$$

FIG. 4 illustrates a configuration example of the address management table 24.

The address management table 24 is a logical/physical translation table for obtaining physical addresses from logical addresses. The address management table 24 has an entry for each chunk. Information stored in each entry includes a logical address 241 and a physical address 242.

The logical address 241 represents a logical address of the chunk, and is specifically a pointer on an address space accessed by the host 2. The logical address 241 is allocated for each of the above-mentioned chunks 33. The physical address 242 is an address indicating a storage destination area of the drive 21. By implementing deduplication, a plurality of physical addresses respectively corresponding to a plurality of logical addresses storing duplicated chunk data are regarded as the same physical address. In this manner, the data amount (number of regions consumed in drive 21) is reduced.

FIG. 5 illustrates a configuration example of the fingerprint management table 25.

The fingerprint management table 25 is a management table used to search for duplicated chunk data from data sets stored in the drive 21 (or from data sets on the CM 13, which are data sets unwritten in the drive 21, (so-called dirty data sets)). Information stored in entries in the fingerprint management table 25 include a characteristic fingerprint 251 and a logical address 241.

The characteristic fingerprint 251 is a fingerprint calculated from characteristic chunk data. The logical address 241 represents a storage destination logical address of the characteristic chunk data.

In an entry in the fingerprint management table, a physical address instead of the logical address 241 may be registered. Checking whether peripheral data of characteristic chunk data match with each other, however, requires reading the peripheral data of the characteristic chunk data. Registering logical addresses can thus reduce the overhead of referencing the address management table 24.

FIG. 6 illustrates a configuration example of the sampling period management table 26.

The sampling period management table 26 is a table for managing sampling periods that are dynamically changed. The sampling period management table 26 has an entry for each zone. Information stored in each entry includes an LUN 261, a zone #262, aggregate number 263, a total duplicated length 264, an average duplicated length 265, and a sampling period 266. Note that, in Embodiment 1, the "zone" is an example of a logical storage space, and means each of a plurality of VOL areas (VOL portions) obtained by dividing a VOL. The zone may be a unit larger than the VOL. The zone may have either of a fixed length or a variable length. For example, in a file system, each specified directory may be a zone. In Embodiment 1, the sampling period can be changed in units of zones. The average duplicated length may differ for each zone. In Embodiment 1, the average duplicated length is monitored for each zone, and the sampling period is readjusted for each zone. In this manner, a higher reduction effect can be expected.

The LUN 261 is an identification number used for the host to identify the VOL. The zone #262 is an identification number of the zone. The aggregate number 263 represents the number of duplicated chunk data in a zone. The total duplicated length 264 represents the total length of duplicated data in the zone. The average duplicated length 265 is an average value of lengths of duplicated data, and is specifically a value obtained by dividing the total duplicated length 264 by the aggregate number 263 (for example, the quotient). As described above, when each duplicated data is larger than the chunk, the average duplicated length 265 can be larger than the length of the chunk 33. The sampling period 266 represents a sampling period that is currently set for the zone.

Now, processes to be implemented in this embodiment are described.

Figure 7:
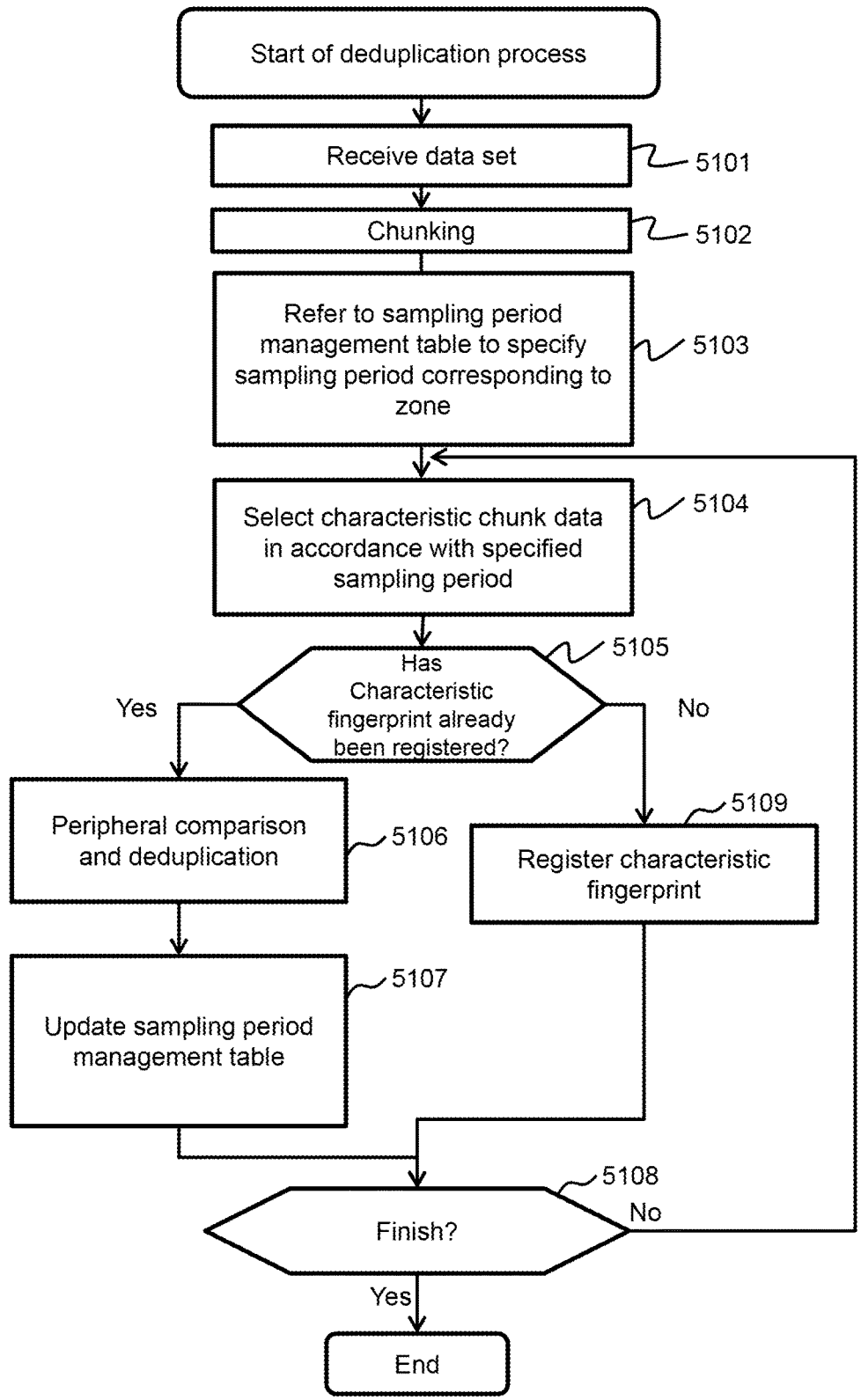
FIG. 7 is a flowchart illustrating an example of a flow of a deduplication process according to Embodiment 1.

FIG. 7 is a flowchart illustrating an example of the flow of the deduplication process. Although not specified in FIG. 7, a trigger to implement deduplication may be when data is written in the drive 21 in response to a write command from the host 2, or deduplication may be periodically implemented irrespective of a write command from the host 2. In general, the former operation is called "inline operation", and the latter operation is called "post-process operation". In Embodiment 1, the deduplication process may be implemented by either of inline operation or post-process operation.

The deduplication unit F3 receives a data set (Step 5101). The data set may be chunk data or data that is larger in length than the chunk data (data on logically successive addresses). For inline operation, the received data set is a data set written from the host 2 (for example, dirty data stored in the CM 13). For post-process operation, on the other hand, the received data set is a data set read from the drive 21 (for example, data having a fixed length determined by the controller 10 in advance).

Next, the deduplication unit F3 implements chunking on the received data set (Step 5102). The "chunking" is a process of dividing the received data set into units of chunks 33. When the chunk 33 has a fixed length, a process of dividing the data set into predetermined chunk sizes is implemented. When the chunk 33 has a variable length, on the other hand, the data set is divided in accordance with a predetermined rule. A method of chunking a data set with a variable length is described, for example, in the following document. Zhu, K. Li, and H. Patterson, "Avoiding the disk bottleneck in the Data Domain deduplication file system" The 6th USENIX Conference on File and Storage Technologies (FAST '08), February 2008.

Next, the deduplication unit F3 refers to the sampling period management table 26 to specify the sampling period 266 corresponding to the corresponding zone 262 (Step 5103).

Next, the deduplication unit F3 selects characteristic chunk data from among the chunk data included in the data set in accordance with the sampling period 266 specified in Step 5103 (Step 5104).

The deduplication unit F3 determines whether a fingerprint determined for the chunk has already been registered in the fingerprint management table 25 (Step 5105). Specifically, the deduplication unit F3 searches characteristic fingerprint 251 in the fingerprint management table 25 for the same characteristic fingerprint as the characteristic fingerprint 36 calculated for the chunk.

When the determination result of Step 5104 is false (Step 5105: No), the deduplication unit F3 registers a pair of the characteristic fingerprint 251 and the logical address 241 of the characteristic chunk data in the fingerprint management table 25 (Step 5109). For example, in the case of post-process operation, the chunk data may be stored in the drive 21, and in this case, a pair of the physical address 242 and the logical address 241 of the chunk data may be stored in the address management table 24. In the case of inline operation, on the other hand, a pair of the physical address 242 and the logical address 241 of the chunk data has already been registered in the address management table 24.

When the determination result of Step 5105 is true (Step 5105: Yes), the deduplication unit F3 reads the chunk data and chunks before and after a chunk whose fingerprint matches with the finger print of the chunk data from the drive 21, and compares whether the read data are the same data to check whether the read data are duplicated data (Step 5106). This process is repeated until the range in which data do not match with each other is reached. More specifically, the deduplication unit F3 refers to the fingerprint management table 25 to acquire a logical address 241 stored in an entry that matches with the fingerprint of the chunk. Then, the deduplication unit F3 refers to the address management table 24 to acquire physical addresses 242 from entries of adjacent logical addresses 241 among the entries corresponding to the acquired logical address 241, and reads the data from the drive 21 to the cache memory 13. It is checked by the CPU 12 whether the read data match with each other by Bit-by-Bit. In this case, although not illustrated, whether the read data match with each other may be checked by dedicated hardware installed on the controller 10, such as an ASIC or an FPGA.

Next, the deduplication unit F3 updates the sampling period management table 26 (Step 5107). Specifically, for example, the deduplication unit F3 refers to the sampling period management table 26 to specify an entry that matches with the zone (LUN and zone #) to which the chunk data belongs. The deduplication unit F3 adds "1" to the value of the aggregate number 263 in the entry, adds the length of the duplicated data determined in Step 5106 to the value of the total duplicated length 264, and changes the value of the average duplicated length 265 to a value obtained by dividing the total duplicated length 264 after the addition by the aggregate number 263 after the addition (for example, the remainder). For post-process operation, in Step 5107, the deduplication unit F3 deletes the duplicated data specified in Step 5106 from the drive 21, and associates the physical address 242 of the same data as the duplicated data to the logical address 241 of the duplicated data. For inline operation, on the other hand, in Step 5107, the deduplication unit F3 deletes the duplicated data specified in Step 5106 from the CM 13, and associates the physical address 242 of the same data as the duplicated data to the logical address 241 of the duplicated data. In any case, when No is determined in Step 5105, the calculated characteristic fingerprint is not registered in the fingerprint management table 25.

The deduplication unit F3 determines whether the presence/absence of duplicated data has been checked for every chunk in the data set (Step 5108). Specifically, for example, the deduplication unit F3 determines whether a chunk for which Step 5104 has not been executed and for which whether the data are duplicated data has not been checked in Step 5106 is left in the data set.

When the determination result of Step 5108 is true (Step 5108: Yes), the process is finished. When the determination result of Step 5108 is false (Step 5108: No), on the other hand, the flow returns to Step 5104.

Figure 8:
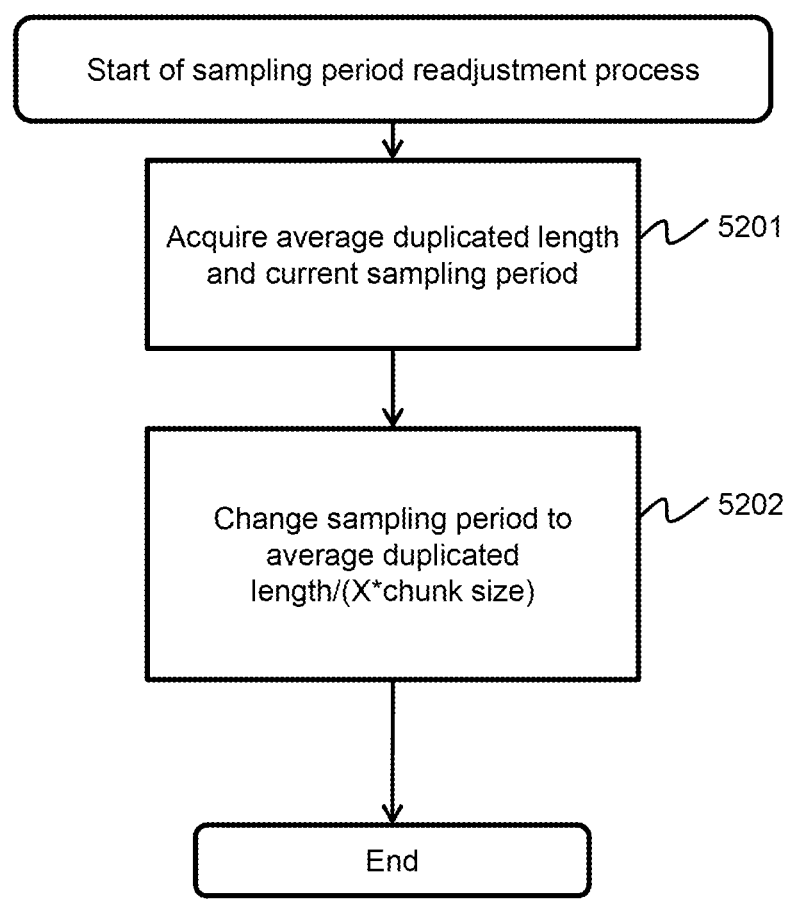
FIG. 8 is a flowchart illustrating an example of the flow of a sampling period readjustment process according to Embodiment 1.

FIG. 8 is a flowchart illustrating an example of the flow of a sampling period readjustment process.

The sampling period readjustment process is executed repeatedly (for example, regularly or irregularly). In this process, the sampling period readjustment unit F4 readjusts the sampling period on the basis of the past implementation result of deduplication (for example, selects a sampling period that maximizing the deduplication rate). This process is implemented for each zone by using the sampling period management table 26. In this process, in order to prevent the reduction effect (deduplication rate) from being decreased even when sampling is performed, the sampling period is set such that the probability with which chunk data included in duplicated data is subjected to deduplication is sufficiently high.

Specifically, the sampling period is brought to be close to the average duplicated length/(X*chunk size). X may be a value determined by the storage controller in advance. X may be set to the controller 10 by a storage administrator via a GUI (Graphical User Interface) displayed on the management computer 3. When X is changed, the probability with which deduplication is successful by sampling is changed. For example, when X=2 is set, as described above, the probability with which chunk data included in duplicated data is subjected to deduplication exceeds 80%.

The sampling period readjustment unit F4 refers to the sampling period management table 26 to acquire an average duplicated length 265 and a sampling period 266 from an entry corresponding to a zone to be processed (Step 5201).

Next, the sampling period readjustment unit F4 changes the sampling period 266 to average duplicated length 265/(X*chunk size).

Embodiment 2

Now, Embodiment 2 is described. Differences from Embodiment 1 are mainly described, and descriptions common to Embodiment 1 are omitted or simplified. Note that, in the description of Embodiment 2, elements different from those in Embodiment 1 are added with symbol "'" at the end of reference symbols.

In Embodiment 2, a more advanced sampling period readjustment process is implemented. In Embodiment 1, control to bring the sampling period to be close to the average duplicated length/(2*chunk size) is implemented. If the average value of the duplicated lengths (lengths of duplicated data) and the mode of the duplicated lengths (largest duplicated length in the duplicated length distribution) are substantially equal to each other, this control can select the sampling period that can suppress the reduction in reduction effect.

For example, however, if the average value of the duplicated lengths and the mode of the duplicated lengths do not match with each other, this approach is not considered to be always optimum.

In view of the above, in Embodiment 2, a sampling period readjustment unit F4' aggregates a reduction effect for each duplicated length, thereby predicting the reduction effect. Because the reduction effect is aggregated for each duplicated length, a calculation overhead and a memory amount for aggregating the reduction effects are increased as compared with Embodiment 1, but a more accurate reduction effect can be predicted.

Enabling the reduction effect to be predicted enables a sampling period that is necessary and sufficient for achieving target deduplication performance or a target reduction effect to be selected. Here, priority order between the deduplication performance and the reduction effect is different depending on use cases, and hence it is preferred to determine which state is the optimum state.

In Embodiment 2, a target value indicating how the reduction in reduction effect is permitted is set. The reduction effect becomes highest when the sampling period is set to "1" because fingerprints are calculated and compared for each chunk data. A value expressed in percent of the reduction rate from the reduction effect obtained when the sampling period is "1" is defined as "target reduction rate" in Embodiment 2. For example, when the target reduction rate is 90%, it is a goal to select a maximum sampling period that achieves 90% of the reduction effect obtained when the sampling period is "1". For example, the target reduction rate may be set to a controller 10' by a storage administrator via a GUI (Graphical User Interface) displayed on a management computer 3'. For example, the numerical value (unit is %) of the target reduction effect itself may be input from the storage administrator, or performance priority desired by a storage administrator may be selected from three levels of performance priority: "High", "Middle", and "Low". "High" may be a target reduction rate of 60%, "Middle" may be a target reduction rate of 80%, and "Low" may be a target reduction rate of 100%. In this manner, the target reduction rate may become smaller as the performance priority becomes higher, and the target reduction rate may become higher as the performance priority becomes lower. The levels of the performance priority are not limited to three levels.

FIG. 9 illustrates a configuration example of a statistics management table 27 according to Embodiment 2.

The statistics management table 27 is an element included in management information held by the controller 10'. The statistics management table 27 is a frequency distribution obtained by aggregating a reduction effect for each duplicated length (length of duplicated data). The statistics management table 27 exists for each zone, and holds statistical information for the zone. The statistics management table 27 is stored in, for example, a metadata region 22 in the drive 21 based on which the corresponding zone is, or in a memory such as the CM 13. The statistics management table 27 is used to predict how much the reduction effect is changed due to the change of the sampling period corresponding to the zone. The statistics management table 27 has an entry for each duplicated length range. Information stored in each entry includes a duplicated length range 271, a reduction amount 272, a predicted reduction amount 273, and a predicted maximum reduction amount 274.

The duplicated length range 271 is the range for aggregating the duplicated lengths in a frequency distribution, and is generally called "order of frequency distribution". The duplicated length can be determined from the result of execution of the deduplication process. In the drawing, the value of the duplicated length range 271 increases exponentially, but may increase linearly. Note that the "(0 KB, 4 KB)" as the value of the duplicated length range 271 means the range of 0 KB or more and less than 4 KB.

The reduction amount 272 is a total value (cumulative reduction amount) of P individual reduction amounts corresponding to P duplicated data. The individual reduction amount is the difference between the data length before deduplication and the data length of duplicated data. The predicted reduction amount 273 is a predicted value calculated on the basis of the reduction amount 272 and the changed sampling period (predicted value of reduction amount in duplicated length range). In FIG. 9, the predicted reduction amount 273 is a predicted value obtained when the sampling period is changed from "4" to "8". The predicted maximum reduction amount 274 is a predicted value of reduction effect obtained when a sampling period ("1" in this embodiment) is selected to obtain the maximum reduction effect. The predicted maximum reduction amount 274 can be calculated by the same method as that for the predicted reduction amount 273.

In the last entry in the statistics management table 27, the value of the duplicated length range 271 is "total value" (rather than the duplicated length range itself), and each of the reduction amount 272, the predicted reduction amount 273, and the predicted maximum reduction amount 274 is a total value of values in the corresponding column (column values).

Now, a method of calculating the predicted reduction amount is described.

When the sampling period becomes larger, it is highly probable that the reduction in reduction effect is relatively large if the average duplicated length is relatively small. When the sampling period becomes shorter, on the other hand, it is highly probable that the reduction in reduction effect is relatively small if the average duplicated length is relatively small. This relation can be formulated.

If at least one characteristic chunk data is included in successive duplicated ranges, the deduplication process can be implemented for data in the ranges. As described above, the probability $P(N, L_A, L_C)$ with which duplicated data is subjected to deduplication for the sampling period N, the average duplicated length $L_A$, and the chunk size $L_C$ can be determined by Expression (1) described above in Embodiment 1.

The reduction amount that is actually obtained by implementing the deduplication process for the sampling period N, the average duplicated length $L_A$, and the chunk size $L_C$ is defined as $D(N, L_A, L_C)$. The reduction amount obtained when sampling is not performed at all (that is, the sampling period is "1") is defined as $D(1, L_A, L_C)$. In this case, deduplication is successful with the probability $P(N, L_A, L_C)$, and the deduplication fails with a probability $1-P(N, L_A, L_C)$. Then, the reduction effect aggregated only for successful data is $D(N, L_A, L_C)$, and hence the following expressions are roughly established. In actuality, the reduction effects cannot be calculated by such simple expressions because of fluctuation of average values, but the following expressions are sufficient as indices for determining the sampling period.

$$D(N, L_A, L_C) \approx D(1, L_A, L_C) * P(N, L_A, L_C)$$

$$D(1, L_A, L_C) \approx D(N, L_A, L_C)/P(N, L_A, L_C)$$

The same concept can be applied to the calculation of the reduction effect obtained when the sampling period is changed from "N" to "N'". Specifically, in the case where the probability with which duplicated data is subjected to deduplication for the sampling period N, the average duplicated length $L_A$, and the chunk size $L_C$ is defined as $P(N, L_A, L_C)$, and the reduction amount obtained by the deduplication is defined as $D(N, L_A, L_C)$, the reduction amount $D(N', L_A, L_C)$ obtained when the sampling period N is changed to N' can be estimated by the following expression.

$$D(N', L_A, L_C) = D(N, L_A, L_C) * P(N', L_A, L_C)/P(N, L_A, L_C) \quad \text{Expression (2)}$$

$P(N, L_A, L_C)$ is calculated by the expression of $P(N, L_A, L_C) = 1-(1-1/N)^{\wedge}(L_A/L_C)$, and $D(N, L_A, L_C)$ is calculated by actually implementing deduplication. Creating a frequency distribution obtained by aggregating the reduction effect for each duplicated length as described above enables the prediction of the reduction effect. The accuracy of the reduction effect becomes higher as the order of the frequency distribution becomes larger, but if the order is too fine, the size of the statistics management table 27 increases. Thus, it is necessary to set an appropriate value.

Estimation is described below by way of specific examples.

In FIG. 9, the measured value of the reduction amount 272 in the range of the duplicated length from 0 KB to 4 KB is 40,000 KB. Note that it is assumed that the chunk size L is 4 kB. The average duplicated length $L_A$ in this section is not illustrated, but may be strictly calculated in the course of the deduplication process or may be calculated as a median ((0 KB+4 KB)/2=2 KB) in the section for simplicity. In this example, the latter 2 kB is calculated as the average duplicated length. In summary, the reduction effect D(4, 2 KB, 4 KB) when N=4, $L_A$=2 KB, $L_C$=4 KB is 40,000 KB. Thus, the predicted reduction amount 273 obtained when the sampling period is changed to "8" can be determined by the following expression.

$$\begin{aligned} D(8, 2\,KB, 4\,KB) &= D(4, 2\,KB, 4\,KB) * P(8, 2\,KB, 4\,KB)/ \\ &\quad P(4, 2\,KB, 4\,KB) \\ &= 40{,}000\,KB * (1-(1-1/8)\wedge(1/2))/ \\ &\quad (1-(1-1/4)\wedge(1/2)) \\ &= 19{,}283\,KB \end{aligned}$$

By substituting N=1, an estimated value of the predicted maximum reduction amount 274 can also be calculated as follows.

$$\begin{aligned} D(1, 2\,KB, 4\,KB) &= D(4, 2\,KB, 4\,KB) * P(1, 2\,KB, 4\,KB)/ \\ &\quad P(4, 2\,KB, 4\,KB) \\ &= 40{,}000\,KB * (1-(1-1/1)\wedge(1/2))/ \\ &\quad (1-(1-1/4)\wedge(1/2)) \\ &= 298{,}564\,KB \end{aligned}$$

FIG. 10 illustrates a configuration example of the sampling period management table 26' according to Embodiment 2.

Information stored in each entry of the sampling period management table 26' includes, in addition to the information described above in Embodiment 1, a reduction amount 267, a reduction rate 268, and a target reduction rate 269.

The reduction amount 267 is a total value of reduction amounts for a corresponding zone, and is specifically a total value of the reduction amounts 272 in the statistics management table 27 corresponding to the zone. The reduction rate 268 represents the percent of the reduction amount obtained in the current sampling period with respect to the predicted maximum reduction amount, and is specifically a value expressed in percent of a value obtained by dividing the reduction amount 267 by the predicted maximum reduction amount 274 in the last entry in the statistics management table 27. The target reduction rate 269 is a target value of the reduction rate set in advance as described above. In this embodiment, the target reduction rate can be set for each zone, but may be set in larger units, such as in units of LUNs or controllers 10' (for example, when the target reduction rate is set in larger units, the target reduction rate designated for the unit may be set for all zones belonging to the unit).

Figure 11:
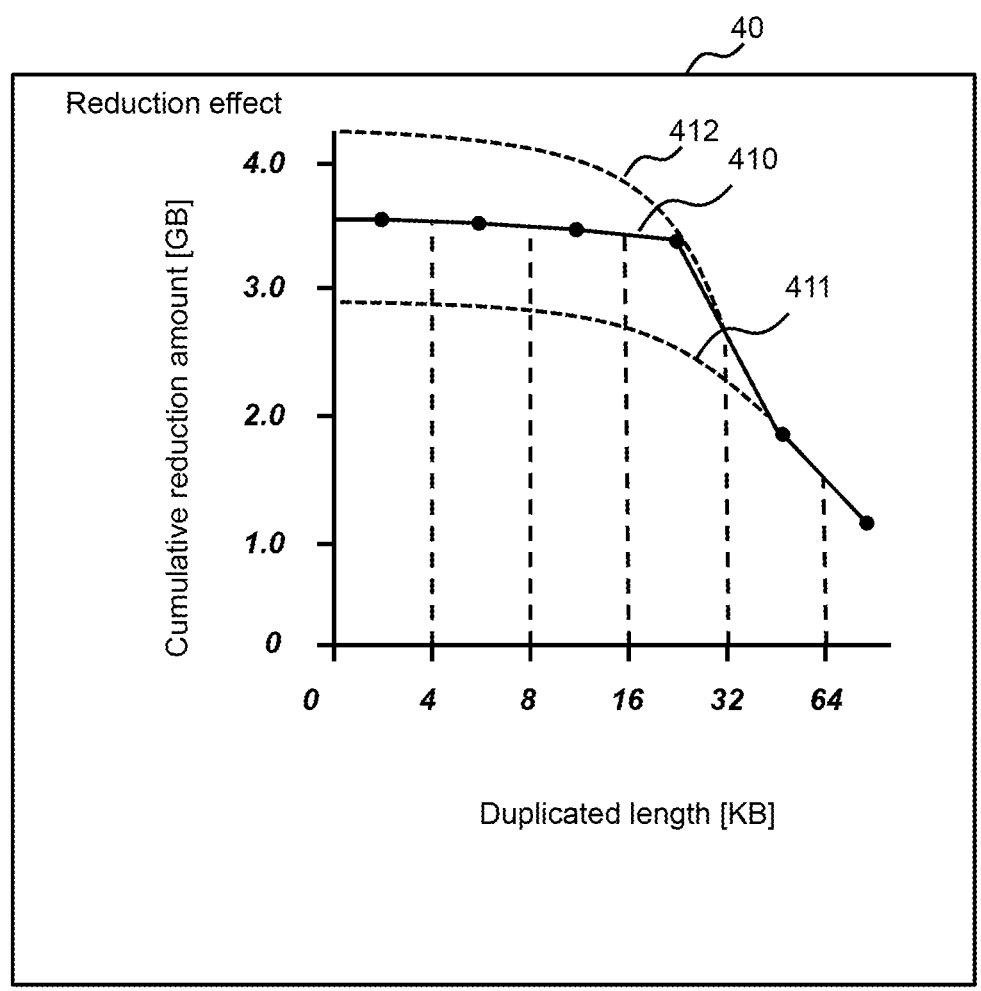
FIG. 11 illustrates an example of a reduction effect screen according to Embodiment 2.

FIG. 11 illustrates an example of a reduction effect screen.

A reduction effect screen 40 may be, for example, a screen for each zone, and is, for example, a screen (for example, a GUI) displayed on the management computer 3' (or another computer such as the host computer 2) by the sampling period readjustment unit F4' or the management computer 3' on the basis of the statistics management table 27 corresponding to the zone.

On the reduction effect screen 40, the horizontal axis represents the duplicated length, and the vertical axis represents a cumulative distribution indicating the reduction amount 272 (cumulative reduction amount) in descending order of the duplicated length range 271. With the cumulative distribution displayed, a value on the vertical axis that corresponds to a minimum value on the horizontal axis corresponds to a total value of reduction amounts 272 (value of the reduction amount 272 in the last entry).

In the drawing, reference symbol 410 represents a cumulative distribution of the reduction amounts 272, reference symbol 411 represents a cumulative distribution of the predicted reduction amounts 273, and reference symbol 412 represents a cumulative distribution of the predicted maximum reduction amounts 274. The solid line means measured values, and the broken lines mean predicted values based on measured values. All of the cumulative distributions are shown in FIG. 11, but at least one of the cumulative distributions may be displayed.

Visualizing the reduction effect as described above enables how the reduction amount changes due to the change of the sampling period to be visually recognized.

Figure 12:
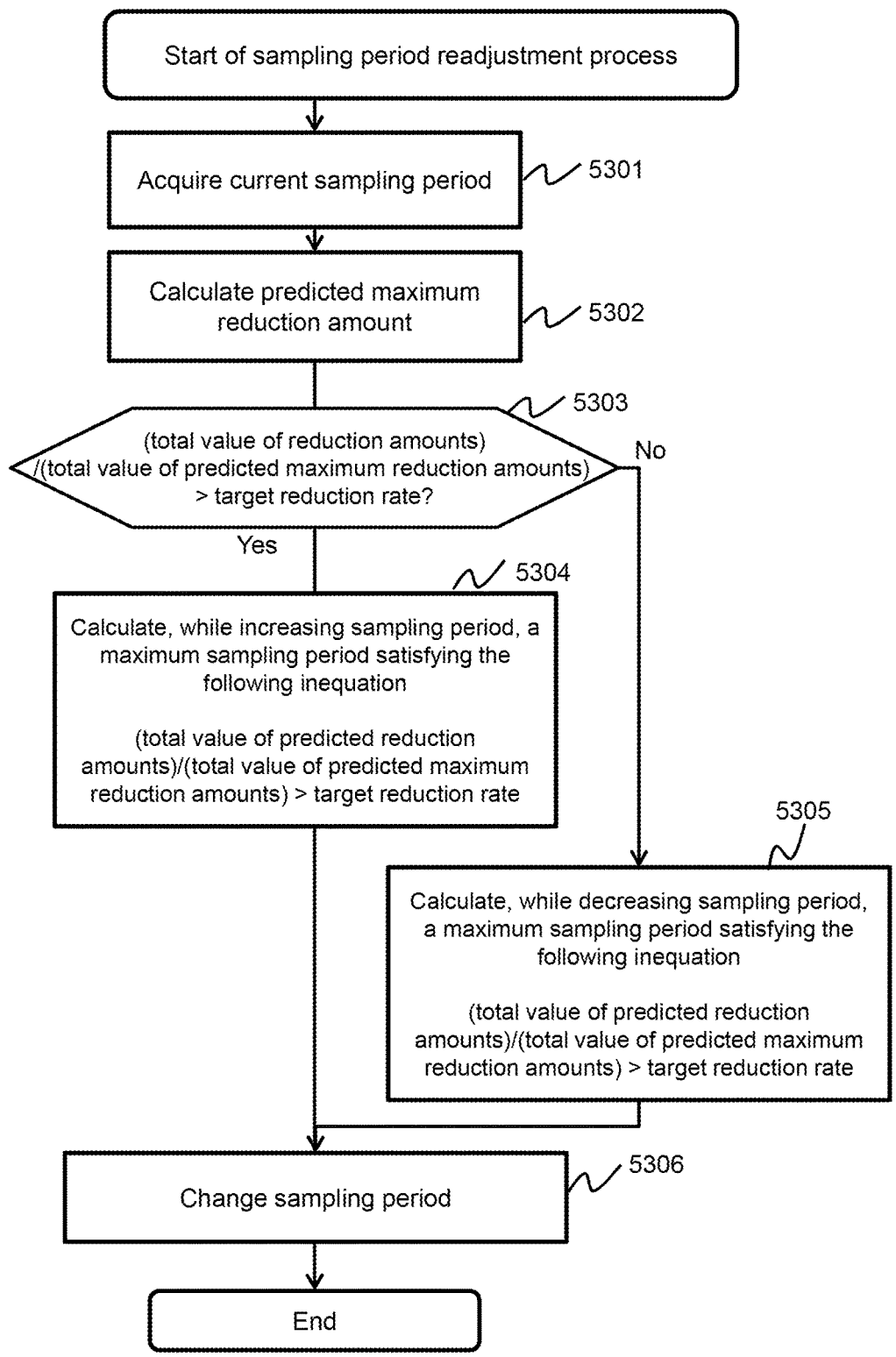
FIG. 12 is a flowchart illustrating an example of the flow of a sampling period readjustment process according to Embodiment 2.

FIG. 12 is a flowchart illustrating an example of the flow of a sampling period readjustment process according to Embodiment 2.

This process is repeatedly performed for each zone. In this process, a sampling period management table 26' and a statistics management table 27 corresponding to a zone concerned.

The sampling period readjustment unit F4' refers to the sampling period management table 26' to acquire a sampling period 266 from an entry corresponding to a zone to be processed (Step 5301).

Next, the sampling period readjustment unit F4' uses the acquired sampling period 266 and a reduction amount 272 in the statistics management table 27 to calculate a predicted maximum reduction amount 274 for each duplicated length range 271 (Step 5302). The predicted maximum reduction amount 274 is calculated by using Expression (2) as described above.

Next, the sampling period readjustment unit F4' determines whether an inequality of "(total value of reduction amounts 272)/(total value of predicted maximum reduction amounts 274)>target reduction rate 269" is established (Step 5303).

When the determination result of Step 5303 is true, it means that it is possible to achieve a reduction rate equal to or higher than the target reduction rate 269 even when the sampling period is further increased. Thus, the sampling period readjustment unit F4' determines, while increasing the sampling period, whether an inequality of "(total value of predicted reduction amounts 273 in the changed sampling period)/(total value of predicted maximum reduction amounts 274)>target reduction rate 269" is satisfied, thereby calculating a maximum value of the changed sampling period N' satisfying the inequality (Step 5304). Specifically, for example, the following steps may be implemented.

(Step 5304-1) The sampling period readjustment unit F4' increases the changed sampling period N' from "X" to "X+a". The initial value of "X" is the same value as the current sampling period N. The increase amount "a" is, for example, an integer of 1 or more, and is specifically, for example, "1". The increase amount "a" may be either of a fixed value or a variable value.

(Step 5304-2) The sampling period readjustment unit F4' calculates, for the sampling period N' updated in Step 5304-1, the predicted reduction amount 273 for each duplicated length range 271, thereby calculating a total value of the predicted reduction amounts 273.

(Step 5304-3) The sampling period readjustment unit F4' determines whether an inequality of "(total value of predicted reduction amounts 273 in the changed sampling period)/(total value of predicted maximum reduction amounts 274)>target reduction rate 269" is satisfied. "(Total value of predicted reduction amounts 273 in changed sampling period)/(total value of predicted maximum reduction amounts 274)" can be referred to as "expected reduction amount". The "total value of predicted reduction amounts 273 in the changed sampling period" is the value calculated in Step 5304-2. When the result of determination in Step 5304-3 is true, Step 5304-1 is implemented again.

(Step 5304-4) When the result of determination in Step 5304-3 is false, the sampling period readjustment unit F4' determines the value of the previous "X", rather than the current "X", as the maximum value of the changed sampling period N'.

When the result of determination in Step 5303 is false (Step 5303: No), on the other hand, it means that the target reduction rate is not achieved in the current sampling period. Thus, the sampling period readjustment unit F4' determines, while decreasing the sampling period, whether an inequality of "(total value of predicted reduction amounts 273 in the changed sampling period)/(total value of predicted maximum reduction amounts 274)>target reduction rate 269" is satisfied, thereby calculating the maximum value of the changed sampling period N' satisfying the inequality (Step 5305). Specifically, for example, the following steps may be implemented. (Step 5305-1) The sampling period readjustment unit F4' decreases the changed sampling period N' from "Y" to "Y−β". The initial value of "Y" is the same as the value of the current sampling period N. The decrease amount "β" is, for example, an integer of 1 or more, and is specifically, for example, "1". The decrease amount "β" may be either of a fixed value or a variable value.

(Step 5305-2) The sampling period readjustment unit F4' calculates, for the sampling period N' updated in Step 5305-1, the predicted reduction amount 273 for each duplicated length range 271, thereby calculating a total value of the predicted reduction amounts 273.

(Step 5305-3) The sampling period readjustment unit F4' determines whether an inequality of "(total value of predicted reduction amounts 273 in the changed sampling period)/(total value of predicted maximum reduction amounts 274)>target reduction rate 269" is satisfied. The "total value of predicted reduction amounts 273 in the changed sampling period" as used here is the value calculated in Step 5305-2. When the result of determination in Step 5305-3 is true, Step 5305-1 is implemented again.

(Step 5305-4) When the result of determination in Step 5305-3 is false, the sampling period readjustment unit F4' determines the value of the previous "Y", rather than the current "Y", as the maximum value of the changed sampling period N'.

The sampling period readjustment unit F4' updates the value of the current sampling period 266 corresponding to the zone to the value of the changed sampling period calculated in Step 5304 or Step 5305 (Step 5306).

Through the sampling period readjustment process described above, the maximum sampling period among sampling periods with which a reduction rate higher than a target reduction rate can be expected is employed. Consequently, the improvement in performance of deduplication and the suppression in decrease of reduction effect can both be achieved.

While some embodiments have been described above, these embodiments are illustrative for the description of this invention and are not intended to limit the scope of this invention to the embodiments. This invention can be implemented in other various modes.

For example, when the chunk size is variable, an average value of a plurality of chunk sizes respectively corresponding to a plurality of chunk data (or a value based on one or more chunk sizes, such as a maximum value and a minimum value) may be employed as the chunk size used to readjust the sampling period.

For example, in the readjustment of the sampling period, for a plurality of duplicated data, a mode of duplicated lengths may be employed instead of an average value of duplicated lengths (average duplicated length). The average value and the mode of duplicated lengths are both examples of a statistics duplicated data length, which is a value based on at least one duplicated data length among a plurality of duplicated data lengths (duplicated lengths) respectively corresponding to the plurality of duplicated data.

Information held by at least the sampling period management tables 26 and 26' and the statistics management table 27 among the elements included in the management information may be collected by the management computer 3, and the management computer 3 may perform a sampling period readjustment process, a reduction effect screen display process, and other such processes.

REFERENCE SIGNS LIST

1 Storage system

The invention claimed is:
1. A storage system, comprising:
a storage device storing data; and
a controller including a storage unit configured to store fingerprint management information,
wherein the controller is configured to:
calculate a characteristic chunk data from a plurality of chunk data, and the data includes the characteristic chunk data and normal chunk data which is not the characteristic chunk data;
calculate fingerprint information for the characteristic chunk data;
determine whether the calculated fingerprint information for the characteristic chunk data is included in the fingerprint management information without determining whether the fingerprint information for the normal chunk data is included in the fingerprint information;
on a condition that the calculated fingerprint information for the characteristic chunk data is not included in the fingerprint management information, register the fingerprint information of the characteristic chunk data in the fingerprint management information;
on a condition that the calculated fingerprint information for the characteristic chunk data is included in the fingerprint management information, calculate a duplicate range by comparing the data in the storage device contiguous with the fingerprint information with the normal chunk data other than the characteristic chunk data contiguous with the characteristic chunk data; and
execute a deduplication process for the calculated duplicate range.

2. The storage system according to claim 1, wherein the controller is further configured to:
calculate the characteristic chunk data in accordance with a sampling period; and
change the sampling period based on results of past deduplication processes.

3. The storage system according to claim 2, wherein the results of the past deduplication processes include a statistics duplicated data length, which is a value based on at least one duplicated data length among a plurality of duplicated data lengths respectively corresponding to a plurality of duplicated data.

4. The storage system according to claim 3, wherein the statistics duplicated data length is an average value or a mode of the plurality of duplicated data lengths.

5. The storage system according to claim 3,
wherein the past deduplication processes include a sampling period corresponding to a logical storage space to be processed among a plurality of sampling periods respectively corresponding to a plurality of zones that are a plurality of logical storage spaces,
the controller is further configured to monitor a statistics duplicated data length for each logical storage space, and
the controller is further configured to update the sampling period for each logical storage space.

6. The storage system according to claim 5, wherein each of the plurality of logical storage spaces is a partial region of a logical volume or a directory in a file system.

7. The storage system according to claim 3,
wherein the controller is further configured to execute a sampling period readjustment process including a determination as to whether a current sampling period is appropriate based on the results of past deduplication processes, and
the controller is further configured to update the sampling period on a condition that a result of the determination in the sampling period readjustment process is true.

8. The storage system according to claim 7, wherein the controller is further configured to perform the determination by using a current sampling period, a size of the chunk data, and the statistics duplicated data length.

9. The storage system according to claim 3, wherein the controller is further configured to change a current sampling period based on a plurality of cumulative reduction amounts respectively corresponding to a plurality of duplicated data length ranges.

10. The storage system according to claim 9, wherein the controller is further configured to change the current sampling period to a maximum value among sampling periods in which a value obtained based on the plurality of cumulative reduction amounts and a plurality of predicted maximum reduction amounts respectively corresponding to the plurality of duplicated data length ranges becomes equal to or larger than a target value.

11. The storage system according to claim 3, wherein the controller is further configured to display at least one of a first cumulative distribution based on a plurality of cumulative reduction amounts respectively corresponding to a plurality of duplicated data length ranges for a current sampling period, a second cumulative distribution based on a plurality of maximum predicted cumulative reduction amounts respectively corresponding to the plurality of duplicated data length ranges for the current sampling period, and a third cumulative distribution based on a plurality of predicted cumulative reduction amounts respectively corresponding to the plurality of duplicated data length ranges for the current sampling period being changed.

12. A storage control method for storing data, comprising:
storing fingerprint management information into a storage unit;
calculating a characteristic chunk data from a plurality of chunk data, and the data includes the characteristic chunk data and normal chunk data which is not the characteristic chunk data;
calculating fingerprint information for the characteristic chunk data;
determining whether the calculated fingerprint information for the characteristic chunk data is included in the fingerprint management information, without determining whether the fingerprint information for the normal chunk data is included in the fingerprint information;
calculating fingerprint information for the characteristic chunk data that is not included in the fingerprint management information, register the fingerprint information of the characteristic chunk data in the fingerprint management information;
calculating fingerprint information for the characteristic chunk data that is included in the fingerprint management information, calculate a duplicate range by comparing the data in a storage device contiguous with the fingerprint information with the normal chunk data other than the characteristic chunk data contiguous with the characteristic chunk data; and
executing a deduplication process for the calculated duplicate range.

13. The storage control method for storing data according to claim 12, further comprising;
calculating the characteristic chunk data in accordance with a sampling period; and
changing the sampling period based on past results of deduplication processes.

* * * * *